(12) United States Patent
Fitsch (10) Patent No.: US 11,085,655 B2
(45) Date of Patent: Aug. 10, 2021

(54) AIR SCRUBBER

(71) Applicant: Boneco AG, Widnau (CH)

(72) Inventor: Manfred Fitsch, Bludenz (AT)

(73) Assignee: BONECO AG, Widnau (CH)

( * ) Notice: Subject to any disclaimer, the term of this patent is extended or adjusted under 35 U.S.C. 154(b) by 109 days.

(21) Appl. No.: 16/614,429

(22) PCT Filed: May 30, 2018

(86) PCT No.: PCT/EP2018/000282
§ 371 (c)(1),
(2) Date: Nov. 18, 2019

(87) PCT Pub. No.: WO2018/219499
PCT Pub. Date: Dec. 6, 2018

(65) Prior Publication Data
US 2020/0182494 A1    Jun. 11, 2020

(30) Foreign Application Priority Data
Jun. 1, 2017   (CH) ..................................... 00709/17

(51) Int. Cl.
*B01D 47/00*    (2006.01)
*B01F 3/04*    (2006.01)
(Continued)

(52) U.S. Cl.
CPC ............... *F24F 3/16* (2013.01); *B01D 33/06* (2013.01); *B01D 33/073* (2013.01); *B01D 47/00* (2013.01); *B01D 47/024* (2013.01); *B01D 47/18* (2013.01); *B01F 3/04* (2013.01); *B01F 3/04007* (2013.01); *B01F 3/04085* (2013.01); *F24F 6/06* (2013.01); *F24F 8/117* (2021.01); *F24F 2006/065* (2013.01)

(58) Field of Classification Search
CPC .... B01F 3/04; B01F 3/04007; B01F 3/04085; B01D 47/00; B01D 33/06; B01D 33/073; F24F 3/14; F24F 3/016; F24F 3/1603; F24F 6/06
See application file for complete search history.

(56) References Cited

U.S. PATENT DOCUMENTS 3,149,626 A    9/1964   Wentling et al.
3,756,579 A *  9/1973   Remick ..................... F24F 6/06
                                                        261/92
(Continued)

FOREIGN PATENT DOCUMENTS

JP    4698753 B2    6/2011
WO    2008/142866 A1    11/2008
WO    2015/179993 A1    12/2015

OTHER PUBLICATIONS

International Search Report of PCT/EP2018/000282, dated Sep. 3, 2018.

*Primary Examiner* — Robert A Hopkins
(74) *Attorney, Agent, or Firm* — Collard & Roe, P.C.

(57) ABSTRACT

An air scrubber has an electrically driven fan and a drum having a mat forming a closed circulating band spanning a support of the drum. The mat is electrically rotatably driven about a rotation axis, wherein a lower part of the drum is immersed in a water basin. The mat can be removed from the drum by a movement in the axial direction and pushed back on again by a movement in the axial direction.

21 Claims, 7 Drawing Sheets

(51) Int. Cl.
*F24F 3/16* (2021.01)
*B01D 47/02* (2006.01)
*B01D 47/18* (2006.01)
*F24F 6/06* (2006.01)
*B01D 33/073* (2006.01)
*B01D 33/06* (2006.01)
*F24F 8/117* (2021.01)

(56) References Cited

U.S. PATENT DOCUMENTS

| | | | |
|---|---|---|---|
| 3,895,083 A | | 7/1975 | Yeagle |
| 4,489,015 A | * | 12/1984 | Petersen ............. B01F 3/04085 |
| | | | 126/113 |
| 4,490,311 A | * | 12/1984 | Shepherd ............ B01F 3/04085 |
| | | | 126/113 |
| 5,795,505 A | | 8/1998 | Burns |
| 2011/0084414 A1 | | 4/2011 | Ahn et al. |

* cited by examiner

AIR SCRUBBER

CROSS REFERENCE TO RELATED APPLICATIONS

This application is the National Stage of PCT/EP2018/000282 filed on May 30, 2018, which claims priority under 35 U.S.C. § 119 of Swiss Application No. 00709/17 filed on Jun. 1, 2017, the disclosures of which are incorporated by reference. The international application under PCT article 21(2) was not published in English.

The invention relates to an air scrubber according to the generic term of patent claim 1.

Contaminations in the air, such as dust, pollen, bacteria, etc. are a problem for some people. That is why there are devices known as "air scrubbers". They bring an air flow in contact with water—which may be mixed with active substances and/or flavourings. As a consequence, contaminations in the form of solid particles remain in the water on the one hand and the air is humidified on the other, which also has a positive effect on the condition of the air in the room.

For air scrubbers, the principle of directing an air flow through a humidified structure is known, in particular a structure made of an absorbent material immersed in water. During this process, the air can release contaminants and—depending on the existing humidity—absorb moisture. For reasons of efficiency, it is important in such air scrubbers that the air flow, on the one hand, comes into contact with the largest possible surface of the structure and, on the other hand, a large air volume can be conveyed, for which a small flow resistance is advantageous. In practice, it is furthermore important that the air scrubber device as a whole is as compact as possible and takes up little space, which is opposed to the requirement of the largest possible surface of the structure.

From WO 2015/179993, an air scrubber is known comprising a radial fan that axially draws in the air and blows it radially outwards. An electrically driven drum rotatable about a drum axis with an open-pore structure and a cage-like drum housing encompassing it on the outside is arranged encompassing the radial fan such that the air blown radially outward is blown through the structure.

Air scrubbers—like devices for room air conditioning—need to be kept as hygienic and sterile or low-germ as possible. For this purpose, it is for example known to place a silver-ion releasing element into a part covered by the water. Even though that is indeed quite effective, this approach does still not meet all requirements regarding hygiene. Easy cleanability of the absorbent structure and the other parts that come into contact with water would be desirable.

It is the object of the present invention to provide an air scrubber that overcomes the disadvantages of the prior art, combines a potentially compact design with great efficiency and is, in particular, easy to clean and manufacture.

According to one aspect of the invention, an air scrubber is provided that is based on a construction with an electrically driven fan inside a housing, in which a water basin and a device for humidification with water from the water basin are also arranged, wherein the device comprises an essentially horizontally positioned drum comprising an open-pore or absorbent structure that is rotatable about a rotation axis by an electric drive, wherein the respective lowest section of the drum is located below a defined minimum filling level of the water basin.

The features of independent claim 1 are provided for solving this problem, wherein the features according to the invention can be gathered from the dependent claims, the description and the enclosed drawings.

According to the invention, a support being cylindrical about the rotation axis is formed on the drum. The rotation axis at the same time is the axis about which the drum is radially and rotationally symmetrically built. Furthermore, the open-pore or absorbent structure is configured as a wettable mat forming a closed circumferential band, said mat spanning the support on its external surface and being removable from the drum by pulling in an axial direction and being capable of being pushed onto the drum by a movement in the axial direction. The mat provided for wetting constitutes the moisture absorbing part of the device.

The rotation axis of the drum is preferably arranged at least essentially horizontally, i.e. the rotation axis is at least approximately parallel to the water surface (e.g. extends at an angle of 10° and a maximum of 20° relative to the horizontal plane). The rotation axis of the fan, on the other hand, can preferably be vertically oriented at an angle to that of the drum, i.e. the air is suctioned in from the outside and blown vertically downward into the drum—or, if necessary, suctioned inversely through the drum and blown out at an angle to the rotation axis of the drum, e.g. vertically upwards.

The air flow guidance for the air conveyed through the fan thereby passes through at least one upper section of the mat and the drum spanned by the mat. For this purpose, the housing is configured as a correspondingly shaped air guidance duct or such a duct is arranged within the housing that guides the air from at least one air inlet on the housing to the drum—by means of the suction and/or pressure effect of the fan—through the mat and ultimately through at least one air outlet on the housing back into the environment. Air conveyed through the fan can be guided through an upper section of the drum spanned with the mat in order to clean and humidify said air.

The mat is open-pore in the sense that the water can permeate into the interior of the mat and can accumulate to surfaces, e.g. to the walls of, for example, cavities, cells, cell walls, fibres or threads inside the mat, i.e. the effective surface available for wetting by the water is larger than a mere outside surface. The mat can advantageously additionally be made from a more or less hydrophilic material or a coating with hydrophilic properties to be applied to the material for example by spraying on or immersion in order to additionally increase the capacity to absorb fluids. In particular, the mat can be a foam-like and/or textile structure. It can, in particular, comprise an inner (support-side) textile layer and an outer layer, wherein a plurality of threads extends between the textile layers, which connect the inner and the outer textile layer, respectively, so that a space criss-crossed by the threads is formed between the textile layers. The threads can extend more or less in parallel within the meaning that they mostly do not touch each other. The threads may have a certain inherent rigidity so that they maintain the distance between the inner and the outer layers, wherein the mat as a whole, however, is compressible against an elastic or restoring force of the threads.

Based on the construction of the invention, the mat can, in particular, be made of a material that does not have sufficient inherent rigidity in order to form a self-sustaining circular cylindrical shape without the support.

Such a mat can be made of a plastic material. It has, for example, become apparent that polyethylene terephthalate (PET) is well suited as a material for the mat, in spite of its hydrophobic properties. If a more hydrophobic material such as PET is used, it becomes apparent in particular that efficiency increases after the device has been used several times, since deposits on the surfaces of the threads (or other elements of the mat) that are hardly visible to the eye increase the water absorbency of the mat as a whole. Again, coatings with different properties can, for example, be applied to the mat to change its moisture or fluid absorption, as mentioned above.

The mat, as explained above, can be removed from the drum by pulling it off in an axial direction (as a closed band). Apart from that, the support is configured such that the mat can be pushed back on in an axial direction by a (for example opposed) movement. Preferably it is provided that the support is formed by a basket-like lattice or mesh having apertures or an array of axially arranged ridges. This results for example in a cylindrical support surface—possibly with perforations—which is provided with axially extending ribs or the like, or formed by them. In any case, the circulating band may be pushed on in an axial direction by means of a simple sliding movement, even when the band is slightly elastic, with a slightly smaller diameter than the diameter of the support in its relaxed state.

Preferably, no connecting elements securing the mat on the support, both with regard to axial and to circumferential relative movements of these elements, are therefore provided between the mat and the support. This specifically rules out that the support is formed by disc-shaped plates arranged in parallel (without peripheral axially extending structures in between) or by circumferential rings arranged at an axial distance to each other, because a band cannot be pushed onto such a configuration by way of an easy sliding movement. In particular, the support may be formed by one or several support elements that are essentially continuous in an axial direction but may be spaced apart by short distances or provided with apertures, for example in the axial and/or the circumferential direction.

Optionally, the support may be tapered to at least one side, i.e. the diameter or the circumference of the support preferably decreases continuously towards at least one end so that the circulating band is fitted via a ramp-like section when it is pushed on, which facilitates fitting.

In addition to the support, the drum may comprise at least one end plate. Preferably, the drum comprises one end plate on each end, in particular a first end plate and a second end plate. If there is one end plate on each side, at least one of the two end plates can be reversibly removed from a drum body which forms the support, and which optionally also comprises the other end plate. Said end plate(s) comprise/s a larger diameter compared to the diameter of the support and constitute/s a stop for the mat toward the sides (in an axial direction). The diameter of the end plate(s) for example corresponds at least approximately to the outer diameter of the mat when it is pushed onto the support. This can preferable be solved by means of a bayonet lock via which the end plate(s) is/are detachably connected to the drum body.

The drum and the device in general may be free of elements on the outside of the mat, in particular of elements overlapping the outside of the mat and rotating with the drum. The mat thus forms the outer surface of the rotating device on the radial-external side in at least an axial area (this does not rule out that the end plates may optionally have a larger diameter than the mat), and it does so along the entire circumference, it can therefore in particular be guided from the inside. The mat can be dimensioned such that, if necessary, it is slightly compressed between the two end plates in the axial direction, i.e. that it is slightly compressed by the two end plates against an elastic restoring force.

According to a preferred embodiment of the invention of the air scrubber the drum and the fan are arranged and/or oriented relative to each other such that the air in the housing is conducted such that the air first flows radially into the interior of the drum through the mat and from there flows outward again radially through the mat. For this purpose, air guidance means may be provided in order to achieve this flow control. As opposed to the statements regarding an air flow that is axial relative to the drum, the mat is perfused twice, which increases efficacy.

Another embodiment of the invention is characterised in that the housing is in particular in two parts in the sense that it comprises a lower housing part in which the basin is configured or arranged and which is free of electronic components and an upper housing part that can be lifted off the lower housing part, with the upper housing part carrying the fan. The upper housing part is therefore removably fitted on the lower housing part. It can therefore be removable without a connection having to be undone or lifting off the upper housing part may require that a connection is undone, for example by turning a locking knob, actuating a latch or the like. The upper housing part itself can also be constructed in a very simple manner, it can, for example, be composed of two partial housing shells. The upper housing part may even consist of one piece.

In embodiments with an upper housing part and a lower housing part, the air scrubber can even be designed in such a way that the upper housing part comprises all electronic components, i.e. all semiconductors and capacitors, if necessary (for control, current conversion, etc.) and also all converters, in particular all motors. In that case, the lower housing part is free of all electronic components. The fan can advantageously also be provided in the upper housing part. The electronic system may also comprise a radio or Bluetooth module via which data can be exchanged with an external control unit or the functions of the air scrubber can be controlled by means of said control unit. Preferably, a connection with a smartphone as the control unit is provided via a suitable application installed thereon.

Other than that, a water tank may be provided from which water flows into the water basin as needed as soon as the water level in said basin has fallen below a specific nominal value. The water level can be controlled by means of an active controller with a water level sensor or passively, for example according to what is called the "birdbath principle". Optionally, measures to reduce unwanted noises can be taken in this regard. Another embodiment of an air scrubber according to the invention is thus characterised in that the lower housing part has a greater length and/or width than the upper housing part, wherein the water basin extends into the section of the lower housing part not covered by the upper housing part and is configured as the support for a removable water tank. Refilling intervals can be significantly increased in this manner Apart from that it is not necessary to deactivate the air scrubber for refilling it, and the upper housing part does also not need to be taken off, because only the water tank needs to be removed for refilling. During the filling period, the air scrubber can continue to be operated with the supply of fluid remaining in the water basin.

Preferably, a lockable filling opening and/or a valve are arranged at a position located within the volume of the water basin when the water tank is positioned on the lower housing part. The valve only allows water to flow from the water tank into the water basin when a minimum filling level in the water basin is not reached and prevents water from flowing out when the water tank is lifted from the lower housing part.

Preferably, both functions are combined in one component, in particular in a screw top for the tank comprising a corresponding valve.

Preferably, at least one filling level sensor is provided for the water in the basin in all embodiments described above. For this purpose, a filling level sensor can only be arranged in the upper housing part and be provided with contactless sensing elements or the lower housing part preferably comprises electric contacts that are connected to an electronic evaluation unit for conductivity measurement arranged in the upper housing part. The at least two conductors then extend downward inside the basin without contact from the point where they form contacts to the upper housing part to a minimum filling level. If the electronic evaluation unit arranged in the upper housing part measures substantial conductivity between the two conductors, the water basin is filled at least to the minimum filling level, otherwise it is not. The air scrubber may be programmed to shut down and/or emit a signal when the minimum filling level is not reached or if the upper housing part is not placed on the lower housing part.

This solution of conductors that can be contacted from the upper housing part has the further advantage that the easy cleanability of all elements in the lower housing part is supported, since the filling level is monitored without movable parts (float gauges or the like), which complicate assembly or make it more difficult to clean the basin as a whole.

The lower housing part can be configured such that the basin has at least the same expansion to all sides as the upper housing part, thus that no other component is arranged laterally next to/in front of/behind the water basin, with the possible exception of a removable water tank.

The method of the invention in particular facilitates easy cleaning of the parts that are in contact with the water during use. For example, the mat as a whole can consist of a flexible material. After its removal from the drum—which is very easy and user friendly due to the construction according to the invention—it can be mechanically machined (milled), which dissolves lime deposits in the simplest way, since limescale is not elastic. In particular, the mat may be machine-washable. During a wash cycle, limescale dissolves due to the mechanical impact and other contaminations are washed away.

Through the method of the invention, the device differs from an evaporator mat (vacuum mat) because it is watered by force. In the present case, the forced watering is due to the rotating motion of the drum about its axis while the underside of the drum is simultaneously immersed in the filled water basin.

The construction with a, for example, textile or possibly foam-like mat spanning a rotatable drum and perfused by air also has major advantages over stacks of wettable discs also forming a drum, as known from the prior art. In such constructions, an inner part of the discs is not wetted due to the design, which is in particular relevant when the water basin is almost empty. Accordingly, part of the air flows past parts that are not wetted and is not effectively washed and humidified.

As opposed to that, it is always ensured in the method of the invention that the entire mat, and thus the entire active surface is wetted as long as the water in the basin reaches the minimum filling level. Since the air flows through the mat, all air will always come into contact with wetted surfaces.

The method of the invention is advantageous for manufacturing as well: compared to disc stacks according to the prior art, much fewer individual parts are required.

Other than that, further parts, in particular the drum, but optionally also the lower housing part forming the basin as a whole or—if necessary—the basin as such may be dishwasher-safe.

In particular, the drum and optionally the lower housing part forming the basin may be dishwasher-safe up to at least 55° C. and/or the mat may be machine-washable at up to 40° C. The properties "dishwasher-safe" and "machine-washable"—up to the corresponding temperatures—may comprise that the corresponding materials are alkaline-stabilised and/or are not significantly impaired in terms of colour or material (brittleness) in at least 100 or at least 150 wash cycles.

Preferably, an embodiment of the invention where the drum is mounted in the lower housing part and the upper housing part carries an electric drum drive which is configured to drive the drum in the housing's assembled state. For this purpose, the drum drive may comprise a transmission means (e.g. a gear) that interacts with the drum so that the drum can be driven by the drum drive when the housing is assembled. By lifting off the upper housing part, the drum is uncoupled from the drive without further measures needing to be taken. In particular, the drum can be driven from above, i.e. the driving means are arranged above the drum axis and engage with a corresponding structure (gear or the like) of the drum from above.

The drum can simply be rotatably mounted in a corresponding socket of the lower housing part and removable from it. Thus, the resulting process for maintenance is as simple as possible. The user merely has to lift the upper housing part (for which it may optionally comprise handholds, for example in the shape of recess grips) and then lift out the drum, whereupon he/she can pull of the mat after removing an end plate and clean it if necessary. The assembly process accordingly works in reverse.

The drum drive may comprise its own electric motor or optionally use the propulsion generated by the motor of the fan through suitable transmission means.

An advantageous optional feature is that the drum comprises a gearwheel engaging with a corresponding gearwheel of the drum drive. A gearwheel of the drum may belong to a part that was originally separately manufactured. This, for example, makes it possible to manufacture the gearwheel—and/or a bearing journal for the drum—from a material particularly suitable for it, for example from a plastic, i.e. a drum body is preferably manufactured from a first plastic and the gearwheel from a second plastic different from the first plastic.

According to an alternative embodiment, all structures for assembling and driving the drum may be arranged only in the upper housing part, wherein a direct and permanent connection of the drive to the drum can advantageously be realised without intermediate elements.

It may preferably be provided that that the upper housing part forms or comprises an air flow guidance hood which is directly and preferably radially connected to the outer surface of the drum in an assembled state of the housing and which guides the air conveyed by the fan radially to the drum, causes the perfusion of the mat and prevents that the air flows past the mat. The upper housing part—if the housing is configured in the manner described above—or the device in general can therefore constitute an air flow guidance which channels the air conveyed through the fan in its assembled state and prevents air from flowing past the mat instead of flowing through the mat. The air flow guidance—it may be configured as an air flow hood—is therefore directly connected to the mat spanning the drum and ends for example at a distance of a maximum of a few millimetres, for example a maximum of 10 mm, a maximum of 8 mm or a maximum of 5 mm from the latter.

It may in particular be advantageous for this type of air flow guidance if the drum is free of elements overlapping the outside of the mat, as mentioned above, and the mat therefore forms the radially outermost surface of the rotating device at least in a central area along the entire circumference in the axial directions. The air flow guidance can thus be brought particularly close to the outer surface of the mat. Such an airflow guidance may in particular be configured tapered toward the mat so that a jet effect is created.

The fan may in particular be arranged above the drum. The fan may be an axial fan or a diagonal fan and have a relatively large diameter. It may be vertically mounted. This constellation has proven particularly advantageous, in particular if the drum takes up a large part of the base of the entire device—which is preferred for reasons of efficiency.

Regardless thereof it is preferred that the drum takes up a large part of the base of the device, for example (with the possible exception of a laterally installed water tank) at least 50% (surface area of the drum in a projection along the vertical axis).

The drum may be symmetrical in the sense that it can be inserted into the lower housing part in two different orientations with the axis of rotation rotated by 180° relative to one another. This increases ease of use for the user, for whom it thus becomes impossible to insert the drum incorrectly.

Apart from that, embodiments may comprise an additional filter element that is arranged such that air drawn in by the fan flows through the filter element before reaching the fan. This is also conceivable in reverse (air is blown through the filter element by the fan). Due to the configuration of the invention, the surface area of the filter element can be chosen to be relatively large and the filter element is thus efficient and low-maintenance even if flow resistance is low (i.e. it rarely has to be replaced).

Instead of the drum described above with an essentially horizontal rotation axis, drums inserted with a different orientation may also be used. If the mat stretched over the drum is sufficiently absorbent, it is, for example, even possible to use a drum with a vertical rotation axis. The water from the water basin, which is on the bottom in this constellation as well, is sucked up by the suction and capillary effect in the mat placed around the drum so that the entire surface of the mat is soaked with water to be evaporated.

All of the features or combinations of features listed above can each individually or in any combination constitute independently protectable solutions within the scope of the invention.

In the following, embodiments of the invention are described in more detail by means of drawings. Corresponding reference numbers in the drawings designate corresponding or analogous elements. Some of the figures show the depicted elements at different scales.

Figure 1:
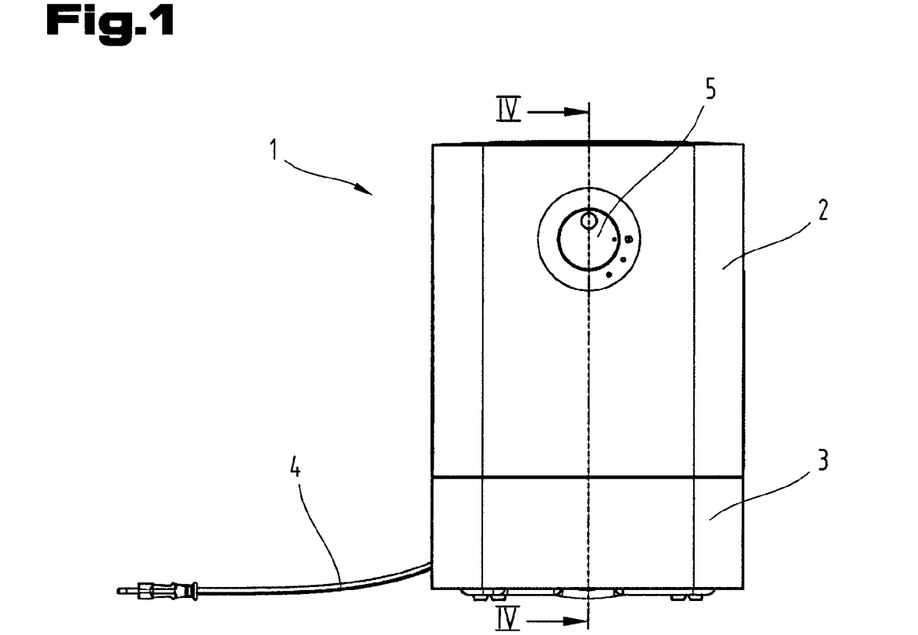
FIG. 1 shows a view of an air scrubber according to the invention.

The air scrubber shown in FIG. 1 comprises a housing consisting of an upper housing part 2 and a lower housing part 3. It can be connected to the grid via a power cable 4 that is preferably routed alongside the lower housing part 2 into the upper housing part. It can be put into operation via one or several controls 5.

Figure 2:
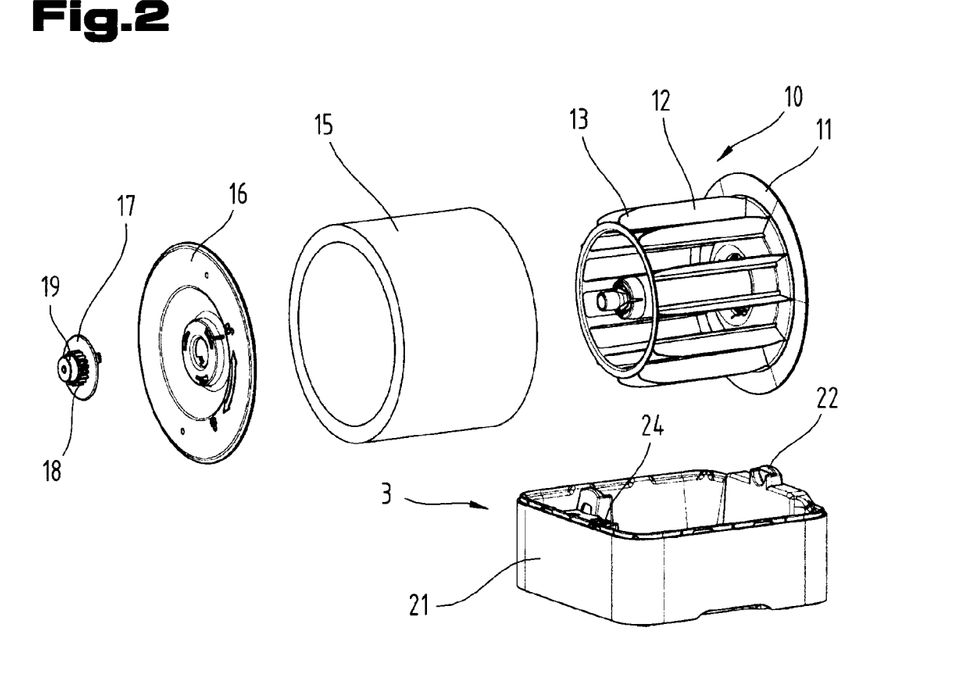
FIG. 2 shows an exploded view of the lower housing part and elements mounted therein.

FIG. 2 shows the lower housing part 3 and parts contained in it in an explosive view. The lower housing part forms a basin 20, 21 for water to be evaporated. After the upper housing part is lifted off, the basin can easily be filled from above, with removal of the drum 10 to 19 not strictly necessary for this purpose.

The basin 20, 21 is for example made of a suitable plastic.

A socket 22 for a pivot 19 of the drum 10 to 19 is arranged on each side of the basin 20, 21. Apart from that, there are two electric contacts 24, for example in the form of stainless steel bands that extend strip-like downward along the interior of the basin from a contact surface on the top visible in FIG. 2. It can be determined from the upper housing part whether the basin 20, 21 is filled with water at least up to the lower end of the contacts 24 by measuring the conductivity between the two contacts 24.

The drum 10 to 19 is rotatably mounted in the basin by means of the pivots 19 in such a way that the bottom of drum 10 to 19 does not quite touch the basin floor.

The drum comprises a drum body 10 with at least a first end plate 11 and a support section that in turn is formed by a plurality of axial ridges 12 in the depicted embodiment. The drum body 10 can be formed integrally or as several parts.

The open-pore mat 15 is made of a flexible material on a textile or plastic basis.

It forms a closed band. It may for example be manufactured by welding together the trailing edges of a one-piece band of suitable length or of several parts of the band—indicated by dashed lines—or attached to one another by means of other methods (suturing or the like) or by means of connecting means such as hook and loop fasteners, snap fasteners or the like. The thickness and therefore the water absorbency of the mat may be reduced along a corresponding axially extending hem line (not depicted in FIG. 2), which does not impair the functionality of the device as a whole.

The mat 15 may for example have an inner and an outer textile layer each, with the inner and the outer layer connected by a plurality of threads extending between them. The material of the mat can also be a suitable plastic, for example polyethylene terephthalate (PET).

The mat 15 spans the support section of the drum body 10 formed by the axial ridges 12 here. It is internally limited by the latter and axially limited by the end plate 11 and preferably a second end plate 16 on both sides, while it forms the external surface of the device on the radial outside, i.e. there are no elements of the drum body 10 overlapping the mat 15 in at least one central area, i.e. the mat is for example only guided from the inside.

There are preferably no connecting elements between the mat 15 and the ridges 12 or any other structures of the drum body 10 that could limit or prevent the axial and, if necessary, also the circumferential relative movement between the mat 15 and its support. However, embodiments are conceivable where the mat 15 is connected to the drum body 10 in such a way that the relative movements are at least limited. The mat 15 can then only be removed from the drum 10 to 19 after it has been radially expanded and lifted from the support, by undoing mechanical connections or the like, possibly also combinations thereof. Finally, embodiments with the mat 15 firmly attached, in particular glued to the drum 10 to 19 are also possible.

The second end plate 16 can be attached to the drum body. It is attached according to the bayonet-lock principle by simply bringing it closer to the drum body followed by a locking rotary motion. The mat 15 has a slight excess length in the axial direction, i.e. it is slightly compressed between the end plates 11, 16 in its mounted state.

The second end plate 16 comprises a bearing and transmission section made as a separate element 17, which forms the aforementioned pivot and a gearwheel 18, which serves to drive the drum 10 to 19.

The bearing and transmission section may in particular be provided as a separate element 17 and attached to the second end plate 16 because it may optionally be made of a different material, for example of a glide-enabling plastic that is particularly suitable for gears because of its dynamic friction properties.

In addition to a pivot, a gear may also be allocated to the first end plate 11, in particular a gear identical to the gearwheel 18 of the aforementioned separate element 17. In particular, the drum 10 to 19 in its assembled state may be symmetrical with respect to reverse insertion, i.e. a rotation of its axis by 180°.

The axial ridges 12 comprise a tapered section 13 towards the side of the second end plate 16. That makes it easier to push the mat onto the support formed by the drum 10 to 19. While being pushed on, the mat 15 in particular may be stretched slightly against its elasticity in the circumferential direction.

The drum 10 to 19 and the basin 20, 21 are in particular dishwasher-safe. The mat 15 is machine-washable. It has been shown that washing in the washing machine is also a very efficient way of decalcifying due to the flexibility of the material of the mat 15.

Lime fragments simply fall off the mat 15 due to deformation during the washing process.

Figure 3:
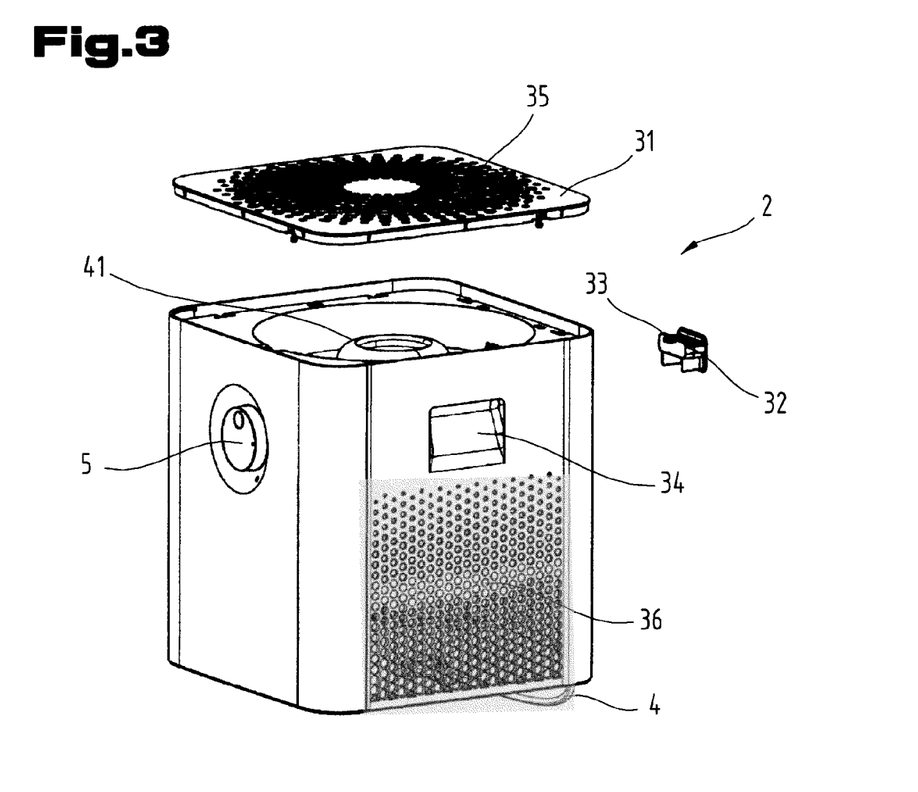
FIG. 3 shows an exploded view of the upper housing part and elements mounted therein.

FIG. 3 shows the upper housing part 2 with the cover 31 and the insertable separate aroma compartment 32. A handhold 34 is formed on each side of the upper part of the housing. These handholds make it possible to easily lift the upper housing part 2 off the lower housing part 3.

The aroma compartment 32 is configured as an extractable drawer into which an aromatic substance can be dripped if needed. The drawer may optionally contain a textile absorption element which absorbs the aromatic substance and releases it in a controlled manner. There may be a perfusable connection to the section actually perfused bypassing the drawer so that air is suctioned past the drawer by way of the Bernoulli effect so that the humidified and scrubbed air released by the device is aromatised.

The flow path of the air conveyed by the fan 41 through the air scrubber 1 leads through corresponding first openings 35 in the cover past the fan 41 into the interior of the drum from above, from there laterally through second openings 36 out of the housing—or the other way around.

The aroma compartment 32 may optionally comprise a tool extension 33 that is insertable into one of the first openings 35 provided for it and by means of which the cover can be removed from the upper housing part 2 without using separate tools.

Figure 4:
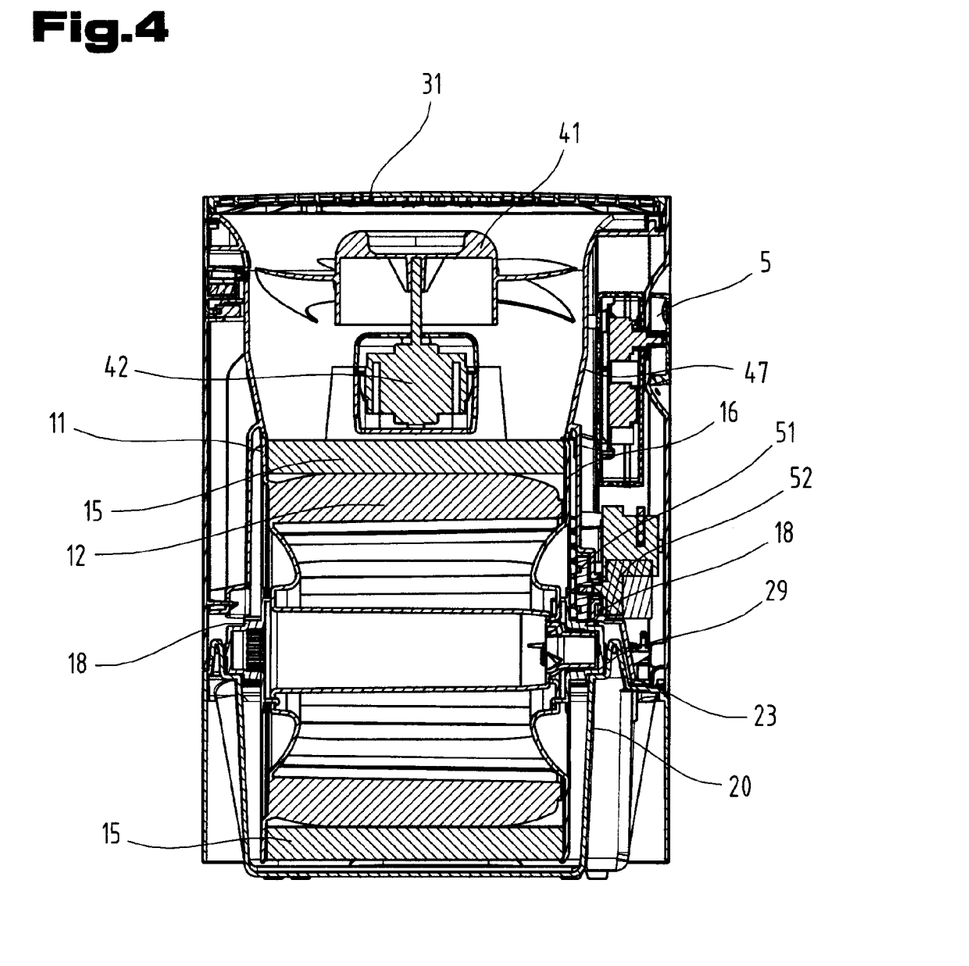
FIG. 4 shows the air scrubber according to FIGS. 1-3 cut along the level IV-IV in FIG. 1.

In the sectional view of FIG. 4 it can be seen that the air guided by the fan 41—an axial fan—is guided by an air flow guidance hood. The latter is configured such in the depicted embodiment that it narrows downwards, towards the drum 10 to 19 so that a certain jet effect is created. The airflow guidance hood 47 extends right up to an upper edge of the drum and ends at a very small distance, for example 3-8 mm from the surface of the mat.

According to one option, the drum 10 to 19 could be driven by the fan electric motor 42 through a corresponding transmission and gear reduction means. As opposed to that, the depicted embodiment comprises its own drum drive motor 52, which is engageable with the gearwheel 18 via a pinion gear drive 51 and drives the drum 10 to 19. Gear reduction means that may be needed can be provided in the housing of the drum drive motor 52.

Instead of the pinion gear drive, it is also possible to drive the drum 10 to 19 via a worm gear drive or a friction gear drive. As an alternative to a single drum with a mat stretched over it, a band-shaped mat running over several separate rollers is also conceivable. One section of this band would thereby run through the water basin 20, 21, while at least one further section of the band is situated in the air flow of the fan.

Figure 5:
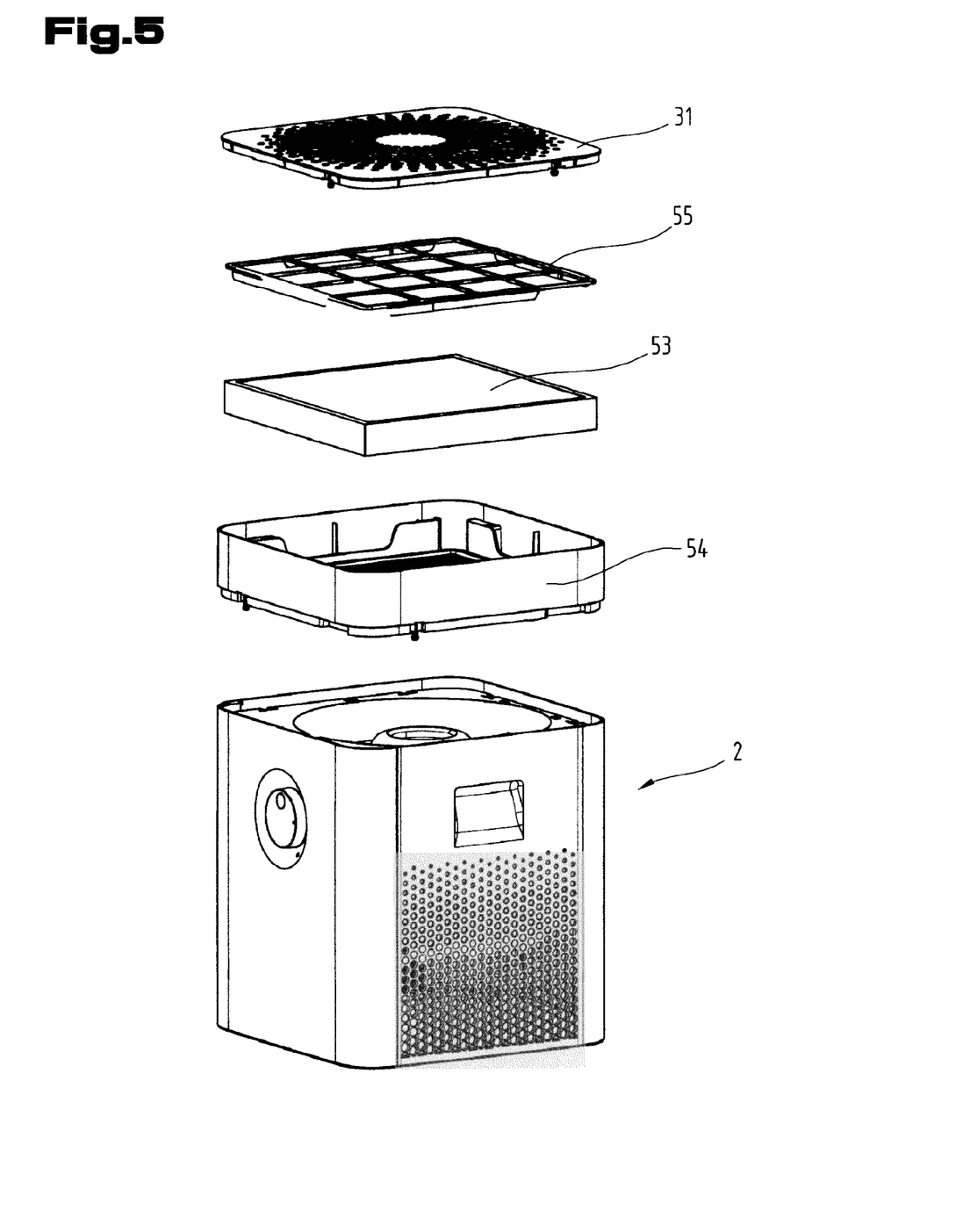
FIG. 5 shows elements of an embodiment with an additional filter element.

FIG. 5 shows an embodiment in which the upper housing part comprises a filter mat 53 in addition to the elements described above. The filter mat 53 may be configured as a simple lint filter or as a HEPA (High Efficiency Particulate Airfilter) particulate air filter; combinations of a coarse filter and a HEPA filter are also possible. For example, a HEPA filter with a pleated fabric, for example made of PE, may be used which fabric is characterised by a large surface area and therefore a low drop in pressure in relation to efficiency. In one embodiment, a coarse filter is connected upstream of a filter of a higher filter class (F to H); reference is made to the applicable European standards (as of 2014) in this regard. HEPA filters serve the purpose of filtering out respirable dusts, pollen, smoke particles, bacteria, etc. from the air.

Additionally or alternatively, an activated carbon filter element may be provided to counteract unpleasant odours or the like. The filter mat 53 may for example be a hybrid structure consisting of a particulate air filter and activated carbon.

The filter mat 53 is mounted in a filter mat support 54 in this case. Above it is a removable coarse pre-filter 55. The filter mat support 54 can be placed onto and attached to the upper housing part 2. The cover 31 is then attached to the upper side of the filter mat support 54.

Figure 6:
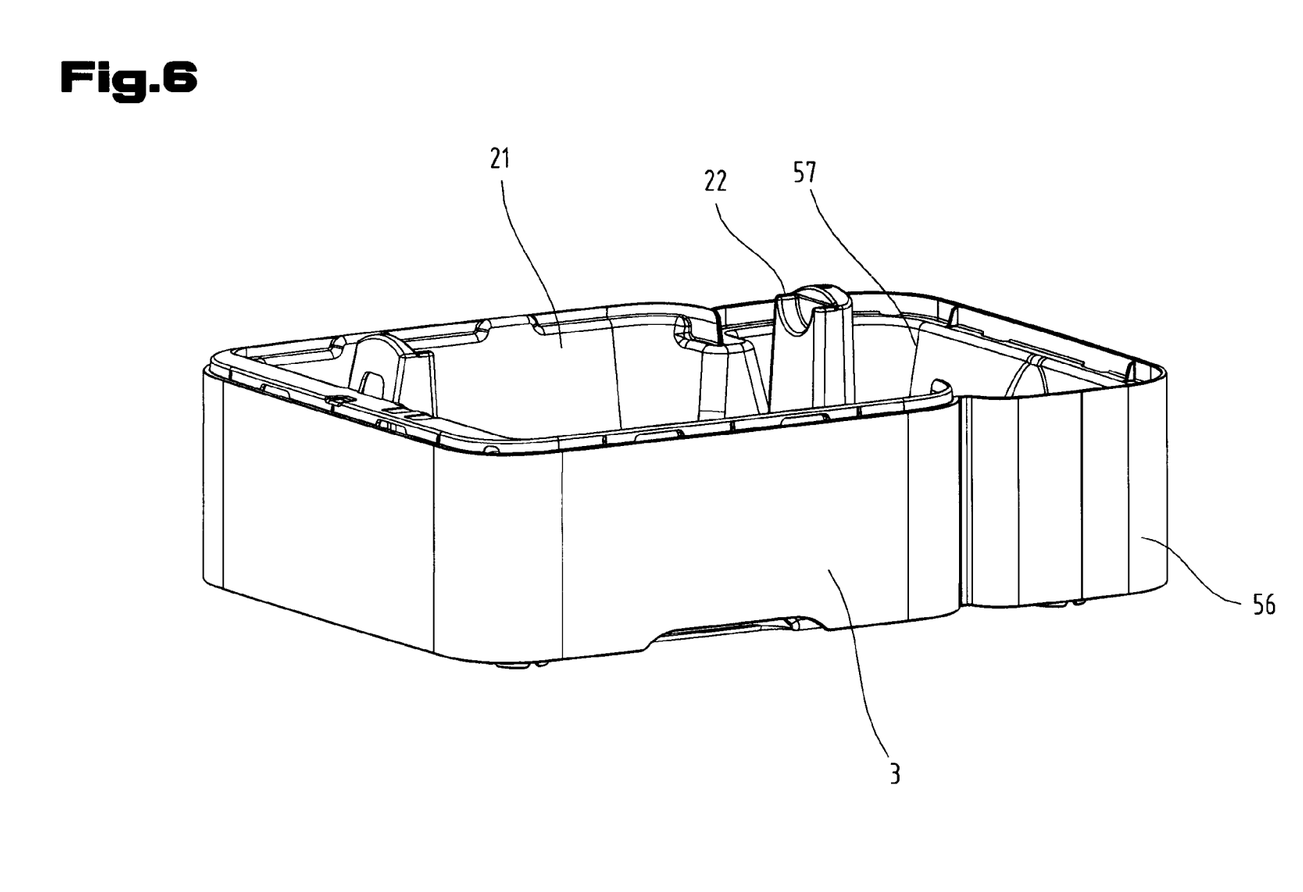
FIG. 6 shows a larger water basin for accommodating a separate water tank.
Figure 7:
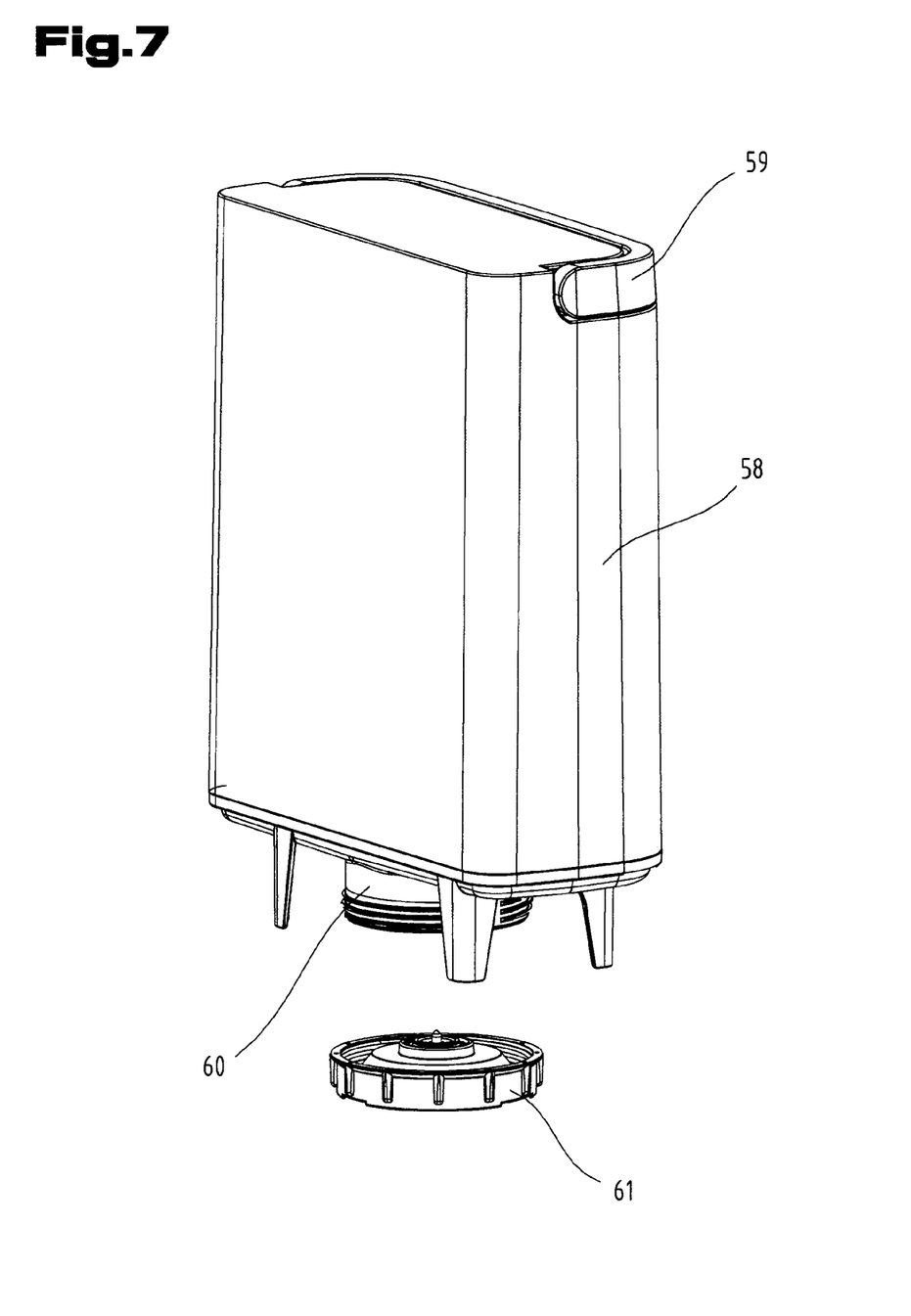
FIG. 7 shows a water tank for use with the water basin of FIG. 6.

In another alternative embodiment, a water tank may be provided in addition or alternative to a filter mat 53 in order to increase the operating time between the necessary filling processes. FIG. 6 depicts a larger lower housing part 3 compared to the embodiment of FIG. 2 and structures provided therein, wherein preferably the water basin 20, 21 for the water to be evaporated is also larger than in the embodiment of FIG. 2. As opposed to the embodiment in FIG. 2, the lower housing part 3 of FIG. 6 is configured larger at least in length and/or width and its section 56 exceeds the part bearing the upper housing part 2 (not depicted here) and is covered by it on top. The basin 20, 21 is preferably also lengthened and/or widened with an additional section 57, extending into section 56 of the lower housing part 3.

Figure 8:
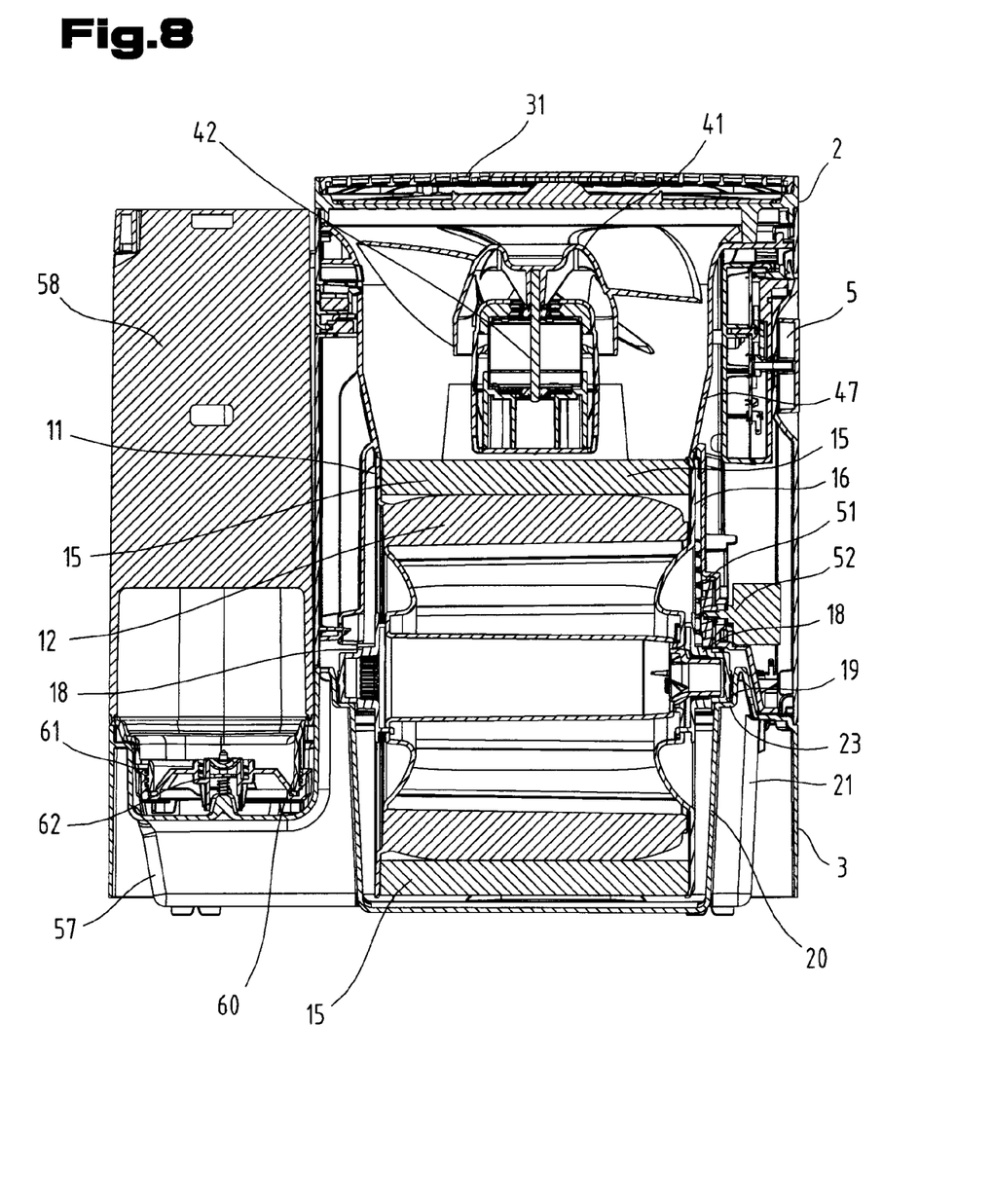
FIG. 8 shows an air scrubber with a larger water basin and a separate water tank in a sectional view according to FIG. 4.

Section 56 carries a preferably separate and advantageously removable water tank 58 that is depicted in FIG. 8. To this end, the water tank 58 for example comprises four legs or similar structures by means of which it may preferably be placed into the water basin 20, 21, 57. The water tank 58 can thereby cover section 56 fully or only in part. For easier handling it advantageously comprises a foldable or removable handhold 59. The water tank 58 can be laterally attached to the housing 2, 3 as depicted and comprises an outlet 60 on the underside which leads into the water basin and which can simultaneously be used as a filling opening. The water tank 58 can, if necessary, also extend over two or several sides of the housing 2, 3 and is, in these cases, configured essentially l-shaped, u-shaped or even annular.

A suitable mechanism causing the outlet to automatically close to the water basin 20, 21, 57 when the water tank 58 is lifted off and water only to flow into the water basin 20, 21, 57 when the water level in the water basin 20, 21, 57 falls below a certain level may preferably be installed in the closure 61 of the outlet or the filling opening 60 that is preferably arranged at a position located within the volume of the water basin, in particular its extended section 57, when the water tank 58 is positioned fitted on the lower housing part 3. In this regard, the process of water flowing can be actively controlled—for example by means of a controllable valve, preferably positioned inside the closure 61—or passively caused, as it is known for example from automatic water troughs for pets.

For example, a valve 62 may be installed in the closure 61 which only allows water to flow from the water tank 58 into the water basin 20, 21, 57 when a minimum filling level in the water basin 20, 21, 57 is not reached and prevents water from flowing out when the water tank 58 is lifted from the lower housing part 3, 56. Of course the functions of closing and controlling the water supply may also be realised in separate components or assemblies that are connected by a rigid or flexible line.

Additionally, a pump may be provided by means of which the water can actively be pumped from the water basin 20, 21, 57 into the water tank 58. Said pump is then preferably positioned near closure 61 or directly in closure 61, wherein the energy supply and actuation of the pump may be effected via metal contacts in the contact area between closure 61 and water tank 58 in the latter case, for example in the area of a possible screw connection.

The refill intervals for the water to be evaporated may also be extended by a water tank 58 if the lower housing part 3 is not larger than the upper housing part 2 or if the water basin 20, 21 is not larger than the upper housing part 2. The direct coupling of a water tank 58 to the housing 2, 3, in particular to the lower housing part 3, is advantageous for this purpose in addition to connecting an external water tank 58 via flexible or rigid lines establishing a fluid-tight line connection between water tank 58 and water basin 20, 21, which is always possible. An embodiment for the above is depicted in FIG. 9.

In this regard, a first connector 63 establishing a connection with the water basin 20, 21 in the lower housing part 3 is preferably installed in a lateral wall of the lower housing part 3. In a water tank 58 that can be laterally connected to the housing 2, 3, a complementary connector 64 is installed on one side at a height corresponding to the first connector 63, wherein the two connectors 63, 64 are configured to establish a fluid-tight connection between water tank 58 and water basin 20, 21. The connectors 63, 64 are preferably lockable against each other, for example by means of a bayonet lock, by means of safety clamps, screw connections, etc. Alternatively or in addition to that, corresponding connecting and locking assemblies may be attached to these components for establishing a releasable connection between the water tank 58 and the housing 2, 3.

The invention claimed is:

1. An air scrubber comprising a housing, an electrically driven ventilator, a water basin and a device configured for humidification with water from the water basin, wherein the device comprises an essentially horizontally mounted drum comprising an open-pore or absorbent structure which is electrically rotatably driven about a rotation axis wherein the respective lowest section of the drum is located below a defined minimum filling level of the water basin, wherein a support is provided on the drum and configured about the rotation axis and the open-pore or absorbent structure is configured as a wettable mat forming a closed circumferential band, said mat spanning the support on its external surface and being removable from the drum by pulling in an axial direction and being capable of being pushed onto the drum by a movement in the axial direction, wherein the air flow guidance for the air conveyed by the electrically driven ventilator passes through at least an upper section of the mat located above the water basin and the drum spanned by the mat.

2. The air scrubber according to claim 1, wherein the support is formed by a basket-like lattice or mesh having apertures or by an array of axially arranged bars.

3. The air scrubber according to claim 1, wherein the drum comprises a first end plate and a second end plate, wherein the second end plate is reversibly removable from a drum body forming the support for removing the mat.

4. The air scrubber according to claim 1, wherein the drum and the electrically driven ventilator are arranged and/or oriented relative to each other and/or wherein the air in the housing is guided such that the air first flows radially into the interior of the drum through the mat and from there flows outward again radially through the mat.

5. The air scrubber according to claim 1, wherein the housing comprises a lower housing part in which the basin is formed or arranged and which is free from electronic components, and an upper housing part that can be lifted off the lower housing part, wherein the upper housing part carries the electrically driven ventilator.

6. The air scrubber according to claim 1, wherein a water tank is at least temporarily connectible to the housing.

7. The air scrubber according to claim 6, wherein the lower housing part has a greater length and/or width than the upper housing part, wherein the water basin extends into the section of the lower housing part not covered by the upper housing part and is configured as the support for a removable water tank.

8. The air scrubber according to claim 7, wherein a lockable filling opening and/or a valve are arranged at a position located within the volume of the water basin when the water tank is positioned on the lower housing part, wherein said valve only allows water to flow from the water tank into the water basin when a minimum filling level in the water basin is not reached and prevents it when the water tank is lifted from the lower housing part.

9. The air scrubber according to claim 1, wherein at least one filling level sensor for the water in the basin is provided.

10. The air scrubber according to claim 1, wherein the drum is mounted in the lower housing part and the upper housing part carries an electric drum drive which is configured to drive the drum in the assembled state of the housing.

11. The air scrubber according to claim 10, wherein the drum comprises a gearwheel with which a corresponding gearwheel of the drum drive engages.

12. The air scrubber according to claim 1, wherein the upper housing part forms or comprises an air flow guidance hood which is directly and radially connected to the outer surface of the drum in an assembled state of the housing and which guides the air conveyed by the electrically driven ventilator radially to the drum, causes the perfusion of the mat and prevents the air from flowing past the mat.

13. The air scrubber according to claim 1, wherein the fan electrically driven ventilator is an axial fan or a diagonal fan.

14. The air scrubber according to claim 1, wherein the drum is configured symmetrically in such a way that it is mountable in two different orientation with a rotation axis rotated by 180° in relation to one another.

15. The air scrubber according to claim 1, wherein the mat comprises an inner and an outer textile layer and wherein the inner and the outer textile layers are interconnected by a plurality of threads.

16. The air scrubber according to claim 3, wherein the second end plate is manually removable from the drum body without tools.

17. The air scrubber according to claim 3, wherein the second end plate is detachably connected to the drum body by a bayonet lock.

18. The air scrubber according to claim 1, wherein a water tank is at least temporarily connectible to a lower housing part of the housing and the water basin.

19. The air scrubber according to claim 8, wherein both functions of allowing water to flow from the water tank into the water basin only when a minimum filling level is not reached and preventing water from flowing from the water tank into the water basin when the water tank is lifted from the lower housing part are combined in a single component.

20. The air scrubber according to claim 9, wherein the lower housing part comprises electrical contacts connected to an electronic evaluation unit for conductivity measurement arranged in the upper housing part.

21. The air scrubber according to claim 11, wherein a drum body is made of a first plastic and the gearwheel is made of a second plastic different from the first plastic.

* * * * *